United States Patent
Kodama (10) Patent No.: US 9,379,447 B2
(45) Date of Patent: Jun. 28, 2016

(54) COAXIALLY-FED SLOT ARRAY ANTENNA AND VEHICLE RADAR APPARATUS

(75) Inventor: Katsuhisa Kodama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1567 days.

(21) Appl. No.: 11/936,404

(22) Filed: Nov. 7, 2007

(65) Prior Publication Data
US 2012/0038503 A1 Feb. 16, 2012

(30) Foreign Application Priority Data
May 25, 2007 (JP) ................................. 2007-139023

(51) Int. Cl.
| | |
|---|---|
| *H01Q 13/22* | (2006.01) |
| *H01Q 21/06* | (2006.01) |
| *H01Q 13/20* | (2006.01) |
| *G01S 7/03* | (2006.01) |
| *H01Q 21/00* | (2006.01) |
| *G01S 13/93* | (2006.01) |

(52) U.S. Cl.
CPC ............. *H01Q 13/203* (2013.01); *G01S 7/032* (2013.01); *H01Q 21/0043* (2013.01); *G01S 13/931* (2013.01)

(58) Field of Classification Search
CPC ... H01Q 13/22; H01Q 21/06; H01Q 21/0043; H01Q 13/203; G01S 7/032; G01S 13/931
USPC ......................................................... 343/767
See application file for complete search history.

(56) References Cited

U.S. PATENT DOCUMENTS

| | | | | |
|---|---|---|---|---|
| 6,126,453 A | * | 10/2000 | Gomez | H01R 24/52 439/63 |
| 6,246,005 B1 | | 6/2001 | Mahlandt et al. | |
| 2003/0122636 A1 | * | 7/2003 | DiBenedetto | H01Q 13/203 333/237 |
| 2013/0093638 A1 | * | 4/2013 | Shoemaker | H01Q 1/007 343/770 |

FOREIGN PATENT DOCUMENTS

| | | |
|---|---|---|
| DE | 42 25 298 A1 | 2/1994 |
| DE | 197 38 381 A1 | 3/1999 |

(Continued)

OTHER PUBLICATIONS

English Translation for Maruyama (JP 2005-192203 A), Jul. 14, 2005.*

(Continued)

*Primary Examiner* — Dameon E Levi
*Assistant Examiner* — Jennifer F Hu
(74) *Attorney, Agent, or Firm* — Sughrue Mion, PLLC; Richard C. Turner (57) ABSTRACT

In a coaxially-fed slot array antenna including a coaxial line unit configured with a coaxial inner conductor and a coaxial outer conductor that incorporates the coaxial inner conductor; a feeding waveguide for feeding an electromagnetic wave to the coaxial line unit by way of a feeding slot; and a sub-array configured, corresponding to the coaxial line unit, with a plurality of emission slots formed on the external wall surface of the coaxial outer conductor, the space enclosed by the coaxial inner conductor and the coaxial outer conductor is filled with a foamed dielectric having a predetermined foaming rate. As a result, provision is made for a coaxially-fed slot array antenna that can enhance the flexibility in arranging the emission slots, change the width and the gradient of the main beam, and suppress a grating lobe.

10 Claims, 7 Drawing Sheets

A-A CROSS SECTION

(56) References Cited

FOREIGN PATENT DOCUMENTS

| | | |
|---|---|---|
| EP | 0 765 002 A2 | 3/1997 |
| JP | 526063 A | 10/1973 |
| JP | 2000-357916 A | 12/2000 |
| JP | 2001-156536 A | 6/2001 |
| JP | 2005-192203 A | 7/2005 |

OTHER PUBLICATIONS

English Translation for Suzuki (JP 2000-357916 A), Dec. 12, 2000.*

* cited by examiner

F I G. 1A

F I G. 1B

A-A CROSS SECTION

A-A CROSS SECTION

A-A CROSS SECTION

A-A CROSS SECTION

A—A CROSS SECTION

FIG. 7C
*Prior Art*

A—A CROSS SECTION

COAXIALLY-FED SLOT ARRAY ANTENNA AND VEHICLE RADAR APPARATUS

BACKGROUND OF THE INVENTION

1. Field of the Invention

The present invention relates to an antenna that emits a beam through a slot array and more particularly to a coaxially-fed slot array antenna suitable to be utilized in a vehicle radar apparatus for observing the surroundings of a reference vehicle.

2. Description of the Related Art

FIG. 7 is a set of views illustrating the configuration example of a conventional coaxially-fed slot array antenna.

Figure 7A:
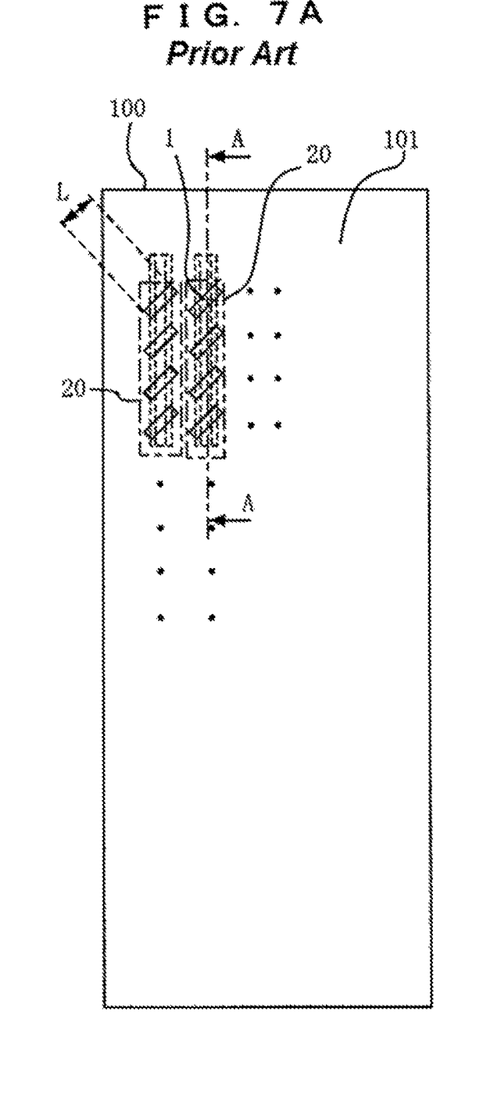
FIG. 7 is a set of views for explaining the configuration of a conventional coaxially-fed slot array antenna.
Figure 7B:
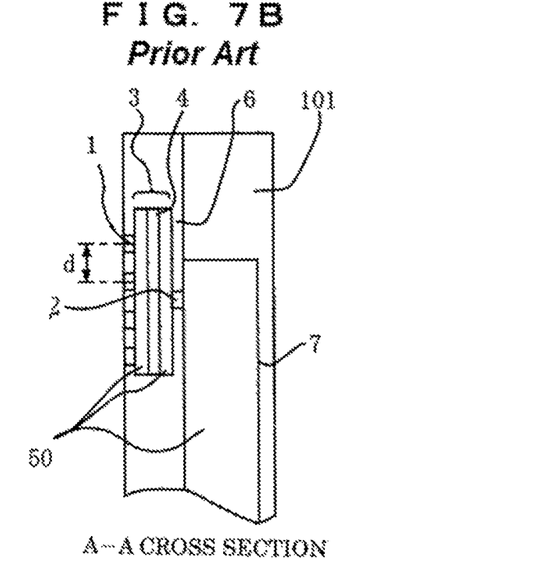
Figure 7C:
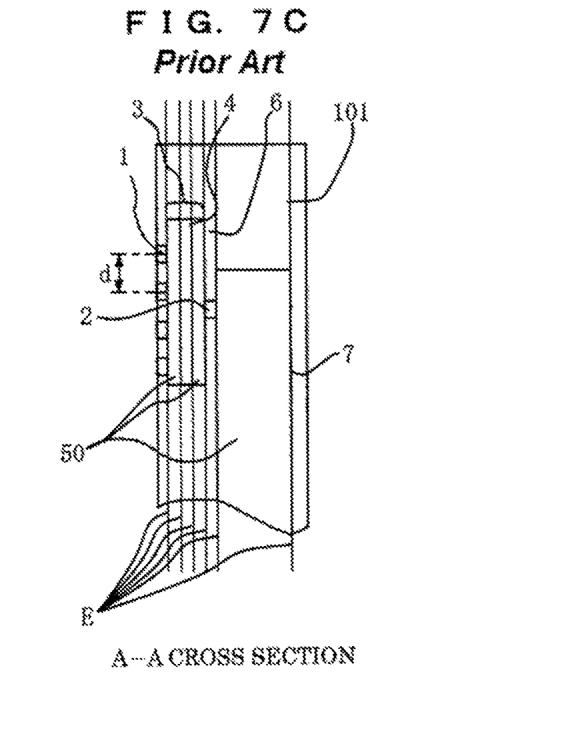

In addition, FIG. 7A is a plan view; FIG. 7B is a cross-sectional view taken along the plane A-A; FIG. 7C is a view for explaining a production method.

The foregoing slot array antenna, utilized, e.g., in a radar apparatus for observing the surroundings of a reference vehicle, is adapted to emit a beam around the reference vehicle and to receive a reflected wave.

In a vehicle radar apparatus and the like, based on a signal (phase difference and the like) transmitted and received through a slot array antenna, the distance to, the relative speed of, and the traveling direction of an obstacle around the reference vehicle are detected.

In a slot array antenna, the frequency of a transmission radio wave, the size of a coaxial line, the positional relationship between an emission slot and a feeding slot and the like decide the phase relationship between the emission slots.

The conventional coaxially-fed slot array antenna illustrated in FIG. 7 includes a coaxial line unit 3, a feeding waveguide 7 for feeding an electromagnetic wave (e.g., millimeter wave) to the coaxial line unit 3 by way of a feeding slot 2, and a sub-array 20 configured with a plurality of emission slots 1 formed on the external wall surface of the coaxial line unit 3; air is filled in the respective spaces 50 in the coaxial line unit 3 and in the feeding waveguide 7.

Because air is filled in the space 50 of the coaxial line unit 3, the inner-tube wavelength λg of the electromagnetic wave that propagates through the coaxial line unit 3 is constant (fixed).

In the conventional slot array antenna, the inner-tube wavelength is constant and the phase is fixed; therefore, the slot spacing cannot freely be selected.

Accordingly, it has been a problem that the gradient θ of a beam with respect to a direction perpendicular to the sub-array, the gradient φ of a beam, in the horizontal plane, with respect to the direction perpendicular to the sub-array, and the beam width θw cannot readily be changed.

Additionally, the beam gradients θ and φ, the beam width θw, and the like will be explained later with reference to FIG. 2.

In addition, the angle θg of a large lobe (referred to as a grating lobe), which is caused, in a direction different from that of the main beam, by an interference condition in which phases are enhanced by each other, is also decided by the frequency of a transmission radio wave and the slot spacing; as is the case with the beam gradients θ and φ, the angle θg of the grating lobe cannot readily be changed.

In a slot array antenna, in order to change the width or the direction of an emitted beam, it is only necessary to change the spacing between adjacent slot arrays or the phase relationship between emission slots.

For that purpose, a method has been proposed in which a dielectric is inserted into a waveguide.

For example, according to Japanese Patent Publication No. 1977-6063, a method has been disclosed in which the direction of an emitted beam is adjusted by making the permittivity of a low-loss dielectric, inserted into a waveguide, to be distributed.

However, in the case where a dielectric is inserted (mounted) in a coaxial line and a waveguide, the number of the kinds of low-loss dielectric materials is limited; therefore a low-loss dielectric material is expensive. Moreover, the number of dielectric materials having a desired permittivity and dielectric loss tangent is small, whereby flexibility in design is restricted.

Additionally, in a slot array antenna, coaxial lines and waveguides are arranged in a complex manner so as to feed power to emission slots.

In a conventional coaxially-fed slot antenna as illustrated in FIG. 7, the coaxial line unit 3 is arranged for each group of emission slots (sub-array); thus, the shape of the coaxial line unit 3 is rendered complex because, for example, a partition is required for each group of slots.

Additionally, for the production of the foregoing slot array antenna, a method has been proposed in which, as illustrated in FIG. 7C, a division plane is produced for each layer and the layers are bonded to one another; however, this method results in an extremely expensive slot array antenna.

In addition, in FIG. 7C, E denotes each of the division planes; the respective parts divided by the division planes E are the layers.

Additionally, it has been a problem that, when a gap is caused between the bonding surfaces, the isolation between adjacent slot arrays cannot be maintained, whereby the characteristics are largely deteriorated.

SUMMARY OF THE INVENTION

Because, in a conventional slot array antenna, the space in a coaxial line unit is filled with air, the inner-tube wavelength is constant and the phase is fixed; therefore, the slot spacing cannot freely be selected.

Accordingly, it has been a problem that the gradient θ of a beam with respect to a direction perpendicular to the sub-array, the gradient φ of a beam, in the horizontal plane, with respect to the direction perpendicular to the sub-array, and the beam width θw cannot readily be changed.

The present invention has been implemented in order to solve the foregoing problems; it is the objective of the present invention to provide a slot array antenna that can readily change the respective phases in the coaxial line unit and the waveguide, that can set the gradients θ and φ of a beam and the angle θg of a grating lobe, and that is low-loss.

A coaxially-fed slot array antenna according to the present invention includes a coaxial line unit configured with a coaxial inner conductor and a coaxial outer conductor that incorporates the coaxial inner conductor, a feeding waveguide for feeding an electromagnetic wave to the coaxial line unit by way of a feeding slot, and a sub-array configured, corresponding to the coaxial line unit, with a plurality of emission slots formed on the external wall surface of the coaxial outer conductor; the space enclosed by the coaxial inner conductor and the coaxial outer conductor is filled with a foamed dielectric having a predetermined foaming rate.

Moreover, a vehicle radar apparatus according to the present invention is characterized by utilizing a coaxially-fed slot array antenna according to the present invention.

Therefore, according to the present invention, the space enclosed by the coaxial inner conductor and the coaxial outer conductor is filled with the foamed dielectric having a predetermined foaming rate; accordingly, the phase of a microwave in the coaxial line unit can readily be changed, whereby a coaxially-fed slot array antenna that can freely set the gradient of a beam emitted from the emission slot and the angle of a grating lobe and that is low-loss can be provided.

Moreover, according to the present invention, the gradient of a beam emitted from the emission slot and the angle of a grating lobe can readily be set, and a vehicle radar apparatus utilizing a low-loss coaxially-fed slot array antenna can be provided.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiments of the present invention will be explained below with reference to the accompanying drawings.

In addition, the same reference characters in the figures denote the same or equivalent constituent elements.

Embodiment 1

Figure 1A:
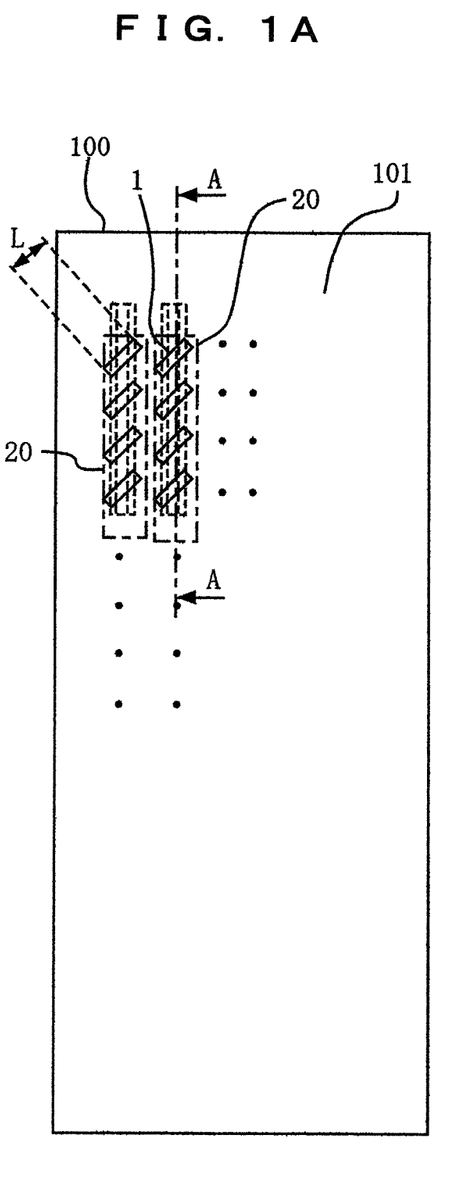
FIG. 1 is a set of views for explaining the configuration of a coaxially-fed slot array antenna according to Embodiment 1.
Figure 1B:
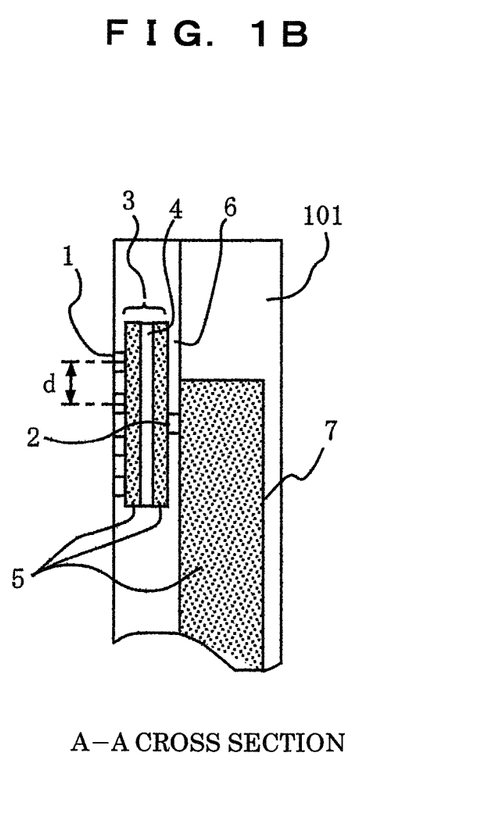

FIG. 1 is a set of views illustrating the configuration of a coaxially-fed slot array antenna according to Embodiment 1; FIG. 1A is a plan view and FIG. 1B is a cross-sectional view taken along the plane A-A.

A coaxially-fed slot array antenna 100 is configured with an external conductor 101, a plurality of emission slots 1, a feeding slot 2, a coaxial line unit 3, a coaxial inner conductor 4, a coaxial outer conductor 6 and a feeding waveguide 7.

In addition, a foamed dielectric 5 is mounted (inserted) in the space of the coaxial line unit 3 consisting of the coaxial inner conductor 4 and the coaxial outer conductor 6.

In FIG. 1, the coaxial outer conductor 6 is a portion of the external conductor 101; the emission slot 1 is formed in the coaxial outer conductor 6 which is a portion of the external conductor 101.

In the coaxially-fed slot array antenna 100, the emission slot 1, the coaxial line unit 3, the coaxial outer conductor 6, and the feeding waveguide 7 are produced as thin-tabular components that are independent from one another.

Then, by bonding the respective tabular components together through the diffusion bonding or one of the various kinds of bonding methods, the integrated-structure coaxially-fed slot array antenna 100 illustrated in FIG. 1 is formed.

FIG. 1A symbolically illustrates two sub-arrays 20 each formed of a plurality of (e.g., four) the emission slots 1 arranged corresponding to a single coaxial line unit 3.

In practice, a plurality of the sub-arrays 20, each corresponding to one of a plurality of the coaxial line units 3, are arranged from side to side and up and down.

Here, the principle will be explained in which an electromagnetic wave (e.g., a millimeter wave) fed via the feeding slot 2 from the feeding waveguide 7 to the coaxial line unit 3 is excited in the emission slot 1.

Both ends of the coaxial line unit 3 are short-circuited by the coaxial outer conductor 6 and the length thereof is set in such a way that a standing wave of a transmission frequency propagates in the tube (i.e., in the coaxial line).

A TEM (transverse electro-magnetic) wave, as a fundamental mode, propagates in the coaxial line unit 3; therefore, in the case where the space enclosed by the inner and the outer conductor (i.e., the coaxial inner conductor 4 and the coaxial outer conductor 6) is filled with air, the inner-tube wavelength $\lambda g$ becomes equal to the free-space wavelength $\lambda 0$.

The current becomes maximal at the antinodes of the standing wave that propagates in the coaxial line unit 3; therefore, arrangement of the respective emission slots 1 at the antinodes enables an electromagnetic wave (e.g., a millimeter wave) to be homogeneously excited and to be effectively emitted.

Accordingly, the length of the coaxial line unit 3 is made to be approximately integer-fold as large as the wavelength $\lambda 0$ and the length L of the emission slot 1 is made to be approximately $\lambda 0/2$, i.e., a resonant length.

Additionally, the slots are arranged in such a way that the distance between each of the positions of the slots situated at both end portions of the sub-array and the corresponding terminal end of the coaxial line unit 3 is approximately $\lambda 0/2$ and the distance d between the two inner emission slots 1 is approximately $\lambda 0$.

However, in the case where, as is the case of a conventional coaxially-fed slot array antenna, the space, in the coaxial line unit 3, enclosed by the inner and the outer conductor (i.e., the space enclosed by the coaxial inner conductor 4 and the coaxial outer conductor 6) is filled with air, the inter-emission-slot distance d is fixed to be the inner-tube wavelength $\lambda g$ (equal to the free-space wavelength $\lambda 0$).

It has been a problem that, in the case where, as described above, $\lambda g$ is the same as or larger than $\lambda 0$, a grating lobe is caused in a direction within $\pm 90°$, whereby the gain for the main beam is decreased.

In order to suppress the effect of the grating lobe, it is required to make the inner-tube wavelength $\lambda g$ shorter than the free-space wavelength $\lambda 0$.

In Embodiment 1, as illustrated in FIG. 1, the space between the coaxial line unit 3 and the feeding waveguide 7 is filled with the foamed dielectric 5 and the inner-tube wavelength $\lambda g$ is shortened through the dielectric characteristics of the filled foamed dielectric 5 so as to solve the foregoing problem.

In addition, the permittivity of the foamed dielectric 5 can be changed by changing the porosity (i.e., the foaming rate).

For example, in the case where the foamed dielectric 5 is produced by use of PE (polyethylene), by controlling the usage amount of the forming agent or the amount of air to be compressed and inserted while foams are produced, a dielectric having a desired porosity can be obtained.

In addition, in FIG. 1, a case in which no foamed dielectric is filled in the feeding slot 2 is illustrated; however, the feeding slot 2 may be filled with a foamed dielectric.

In the case the feeding slot 2 is filled with a foamed dielectric, the width and the length of the emission slot 1 are adjusted in accordance with the permittivity of the foamed dielectric with which the feeding slot 2 is filled.

This applies also to Embodiments 2 and 3 described later.

Figure 2:
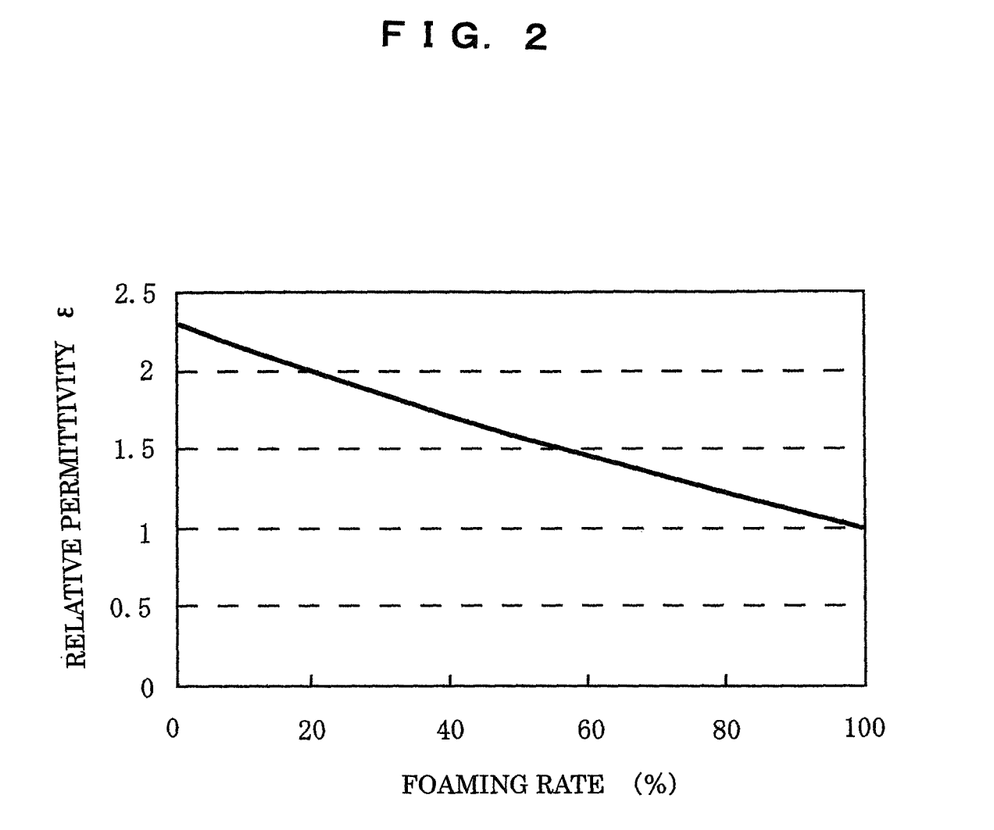
FIG. 2 is a graph representing the relationship between the foaming rate and the relative permittivity in the case where a material is PE.

FIG. 2 is a graph representing the relationship between the porosity (foaming rate) and the relative permittivity $\in$ (ratio of the permittivity of a material to that of a vacuum) in the case where the material is PE.

The relative permittivity $\in$ of the foamed dielectric 5 is in inverse proportion to the porosity (foaming rate).

Accordingly, the inner-tube wavelength $\lambda g$ in the coaxial line unit 3 can be changed by controlling the foaming rate of the foamed dielectric 5 with which the coaxial line unit 3 is filled.

According to Embodiment 1, by filling the coaxial line unit 3 with the foamed dielectric 5 having a predetermined foaming rate, thereby shortening the inner-tube wavelength kg, the inter-emission-slot distance d can be made smaller than the free-space wavelength $\lambda 0$.

As a result, not only can the beam width $\theta w$, the beam gradient $\theta$ with respect to a direction perpendicular to the sub-array, and the beam gradient $\phi$, in the horizontal plane, with respect to the direction perpendicular to the sub-array be changed, but also can the grating lobe be suppressed.

Figure 3:
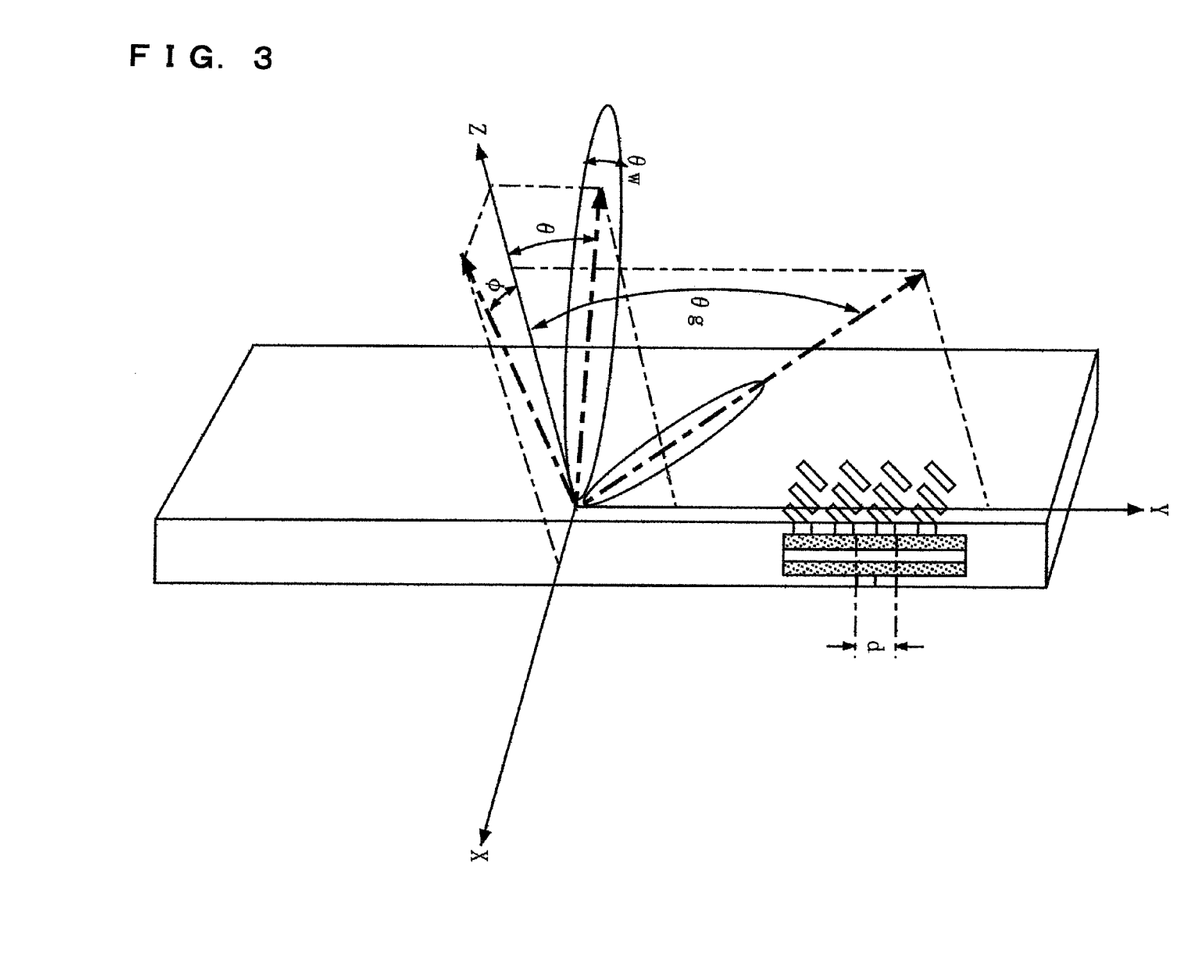
FIG. 3 is a view for explaining the beam-emission direction of a slot array antenna.

FIG. 3 illustrates the beam width $\theta w$, the beam gradient $\theta$ with respect to the direction perpendicular to the sub-array, the beam gradient $\phi$, in the horizontal plane, with respect to the direction perpendicular to the sub-array, and the gradient $\theta g$ of the grating lobe.

Regardless of the kind of its material, the foamed dielectric 5 changes its permittivity, when its porosity (foaming rate) is changed. Accordingly, by appropriately selecting the material of the foamed dielectric 5, a desired porosity (foaming rate) can be obtained.

By filling the space in the coaxial line unit 3 with the foamed dielectric 5, thereby changing the inner-tube wavelength $\lambda g$, the feeding-phase difference between the emission slots and the feeding-phase difference between groups of slots (sub-arrays) can be set.

By controlling the feeding-phase difference, the beam width $\theta w$ and the beam gradient $\theta$ are changed and the occurrence of a grating lobe is suppressed.

As described above, the coaxially-fed slot array antenna according to Embodiment 1 is provided with the coaxial line unit 3 configured with the coaxial inner conductor 4 and the coaxial outer conductor 6 that incorporates the coaxial inner conductor 4, the feeding waveguide 7 for feeding an electromagnetic wave to the coaxial line unit 3 by way of the feeding slot 2, and the sub-array 20 configured, corresponding to the coaxial line unit 3, with a plurality of the emission slots 1 formed on the external wall surface of the coaxial outer conductor 6; the space enclosed by the coaxial inner conductor 4 and the coaxial outer conductor 6 is filled with the foamed dielectric 5 having a predetermined foaming rate.

Accordingly, according to Embodiment 1, the space enclosed by the coaxial inner conductor and the coaxial outer conductor is filled with the foamed dielectric having a predetermined foaming rate; therefore, the phase of a microwave in the coaxial line unit can readily be changed, whereby a coaxially-fed slot array antenna that can freely set the gradient of a beam emitted from the emission slot and the angle of a grating lobe and is low-loss can be realized.

Embodiment 2

Figure 4A:
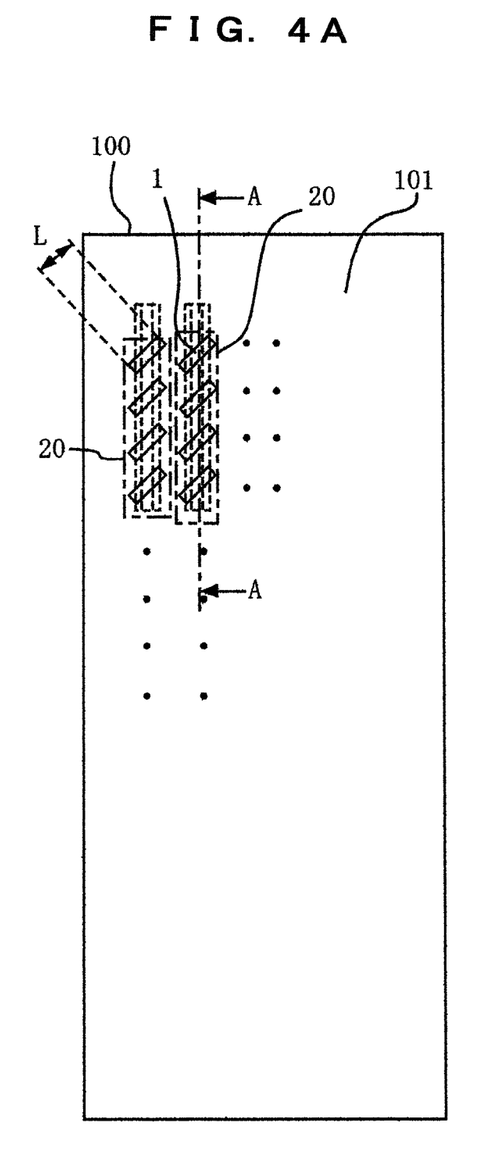
FIG. 4 is a set of views for explaining the configuration of a coaxially-fed slot array antenna according to Embodiment 2.
Figure 4B:
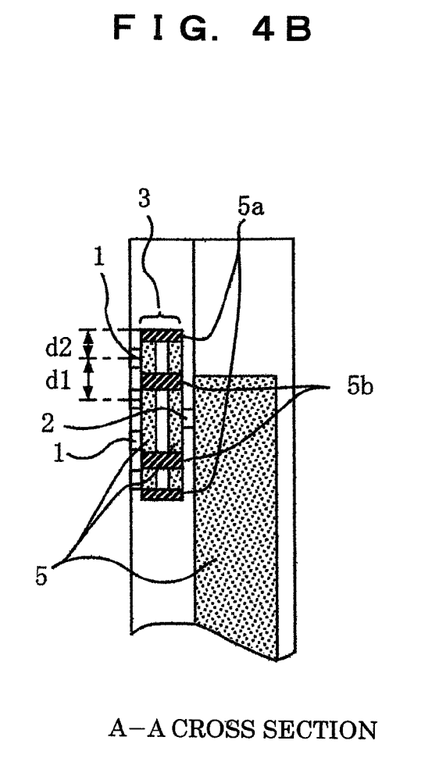

FIG. 4 is a set of views illustrating the configuration of a coaxially-fed slot array antenna according to Embodiment 2; FIG. 4A is a plan view, and FIG. 4B is a cross-sectional view taken along the plane A-A. In addition, in FIG. 4B, reference characters 5a and 5b denote portions where the foaming rate of the foamed dielectric 5 is changed.

The principle of excitation in the emission slot is the same as that of Embodiment 1; therefore, the explanation therefor will be omitted; however, in order to make the slot array effectively excite a standing wave, it is required to arrange the emission slots at positions which are the antinodes of the standing wave and where the current becomes maximal.

As is the case with Embodiment 1 described above, in the case where, in the slot array, the foaming rate of the foamed dielectric 5 is constant, the inter-emission-slot distance is fixed to be "d".

However, when, as illustrated in FIG. 4, the foaming rates of some portions (portions 5a and 5b) of the foamed dielectric 5 are changed, the inner-tube wavelength $\lambda g$ in the coaxial line unit 3 is locally changed; therefore, inter-emission-slot distances d1 and d2 can arbitrarily be changed.

In other words, the emission slots can be arranged at positions (i.e., positions corresponding to the antinodes of a standing wave) where a standing wave is effectively excited by the slot array.

Here, the inter-emission-slot distance d1 is a distance between the emission slots; the inter-emission-slot distance d2 is a distance between the top-end emission slot or the bottom-end emission slot and the corresponding terminal end of the coaxial line unit 3.

In addition, in order to make the slot array effectively excite a standing wave, in practice, due to the effect of the partition between the adjacent sub-arrays and the like, it is required to diminish the distance d2, between each of the emission slots 1 situated at both ends of the sub-array 20 and the corresponding short-circuit position of the coaxial line unit 3, to be slightly shorter than $\lambda 0/2$.

Even in such a case as this, as described above, the distance d2 can be shortened by changing the foaming rate of some portions (portions 5a) of the foamed dielectric 5.

As described above, in the coaxially-fed slot array antenna according to Embodiment 2, the foaming rate of the foamed dielectric 5 is changed in some portions thereof, along the axis direction of the coaxial inner conductor 4, in such a way that the current becomes maximal at the antinodes of a standing wave that occurs in the coaxial inner conductor 4.

In consequence, the inter-emission-slot distance can freely be set so as to make the slot array effectively excite a standing wave.

Embodiment 3

Figure 5A:
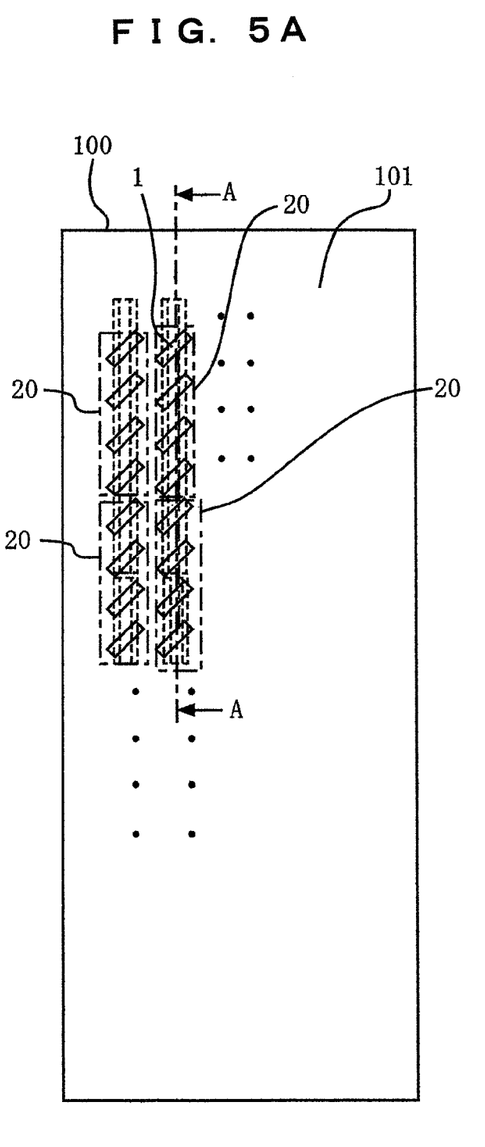
FIG. 5 is a set of views for explaining the configuration of a coaxially-fed slot array antenna according to Embodiment 3.
Figure 5B:
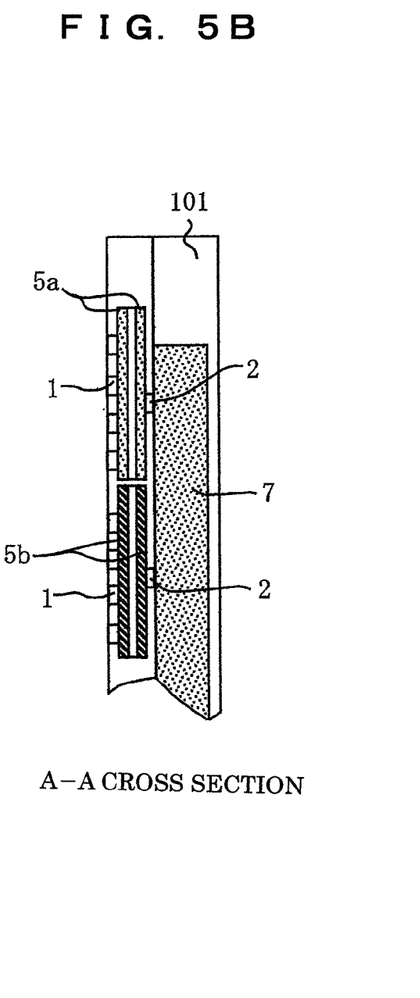

FIG. 5 is a set of views illustrating the configuration of a coaxially-fed slot array antenna according to Embodiment 3; FIG. 5A is a plan view, and FIG. 5B is a cross-sectional view taken along the plane A-A.

In addition, in FIG. 5B, reference characters 5a and 5b denote foamed dielectrics having respective different foaming rates.

FIG. 5 illustrates a coaxially-fed slot array antenna in which the foaming rate of the foamed dielectric with which the coaxial line unit 3 is filled is changed every plurality of emission slots in the vertical direction (i.e., every sub-array 20 in the vertical direction).

By changing the respective foaming rates of the foamed dielectrics 5a and 5b so as to differentiate the inner-tube wavelengths λg, the inter-emission-slot distances d1 and d2 can be changed every sub-array.

In addition, the inter-emission-slot distances d1 and d2 are not indicated in FIG. 5; however, the distances d1 and d2 are the same as those explained in Embodiment 3.

Thus, by changing the respective shapes of beams formed by the slot arrays in the vertical direction, the beam gradient θ, illustrated in FIG. 3, with respect to a direction perpendicular to the slot array is changed.

As described above, it is also possible that, by changing the respective foaming rates of the foamed dielectrics in the slot arrays that are adjacent to one another in the horizontal direction, thereby forming different beams, the beam gradient φ, illustrated in FIG. 3, in the horizontal plane, with respect to the direction perpendicular to the slot array is changed.

As described above, in the coaxially-fed slot array antenna according to Embodiment 3, a plurality of sub-arrays 20 is arranged in the vertical direction; for each sub-array, the foaming rate of the foamed dielectric with which the corresponding coaxial line unit 3 is filled is changed.

Thus, by changing the respective feeding phases for the emission slots of the sub-arrays arranged in the vertical direction, the beam gradient θ with respect to a direction perpendicular to the sub-array can be changed.

In addition, in the coaxially-fed slot array antenna according to Embodiment 3, a plurality of sub-arrays is arranged in the horizontal direction; for each sub-array, the foaming rate of the foamed dielectric with which the corresponding coaxial line unit is filled is changed.

Thus, by changing the respective feeding phases for the emission slots of the sub-arrays arranged in the horizontal direction, the beam gradient φ, in the horizontal plane, with respect to the direction perpendicular to the sub-array can be changed.

Embodiment 4

Figure 6A:
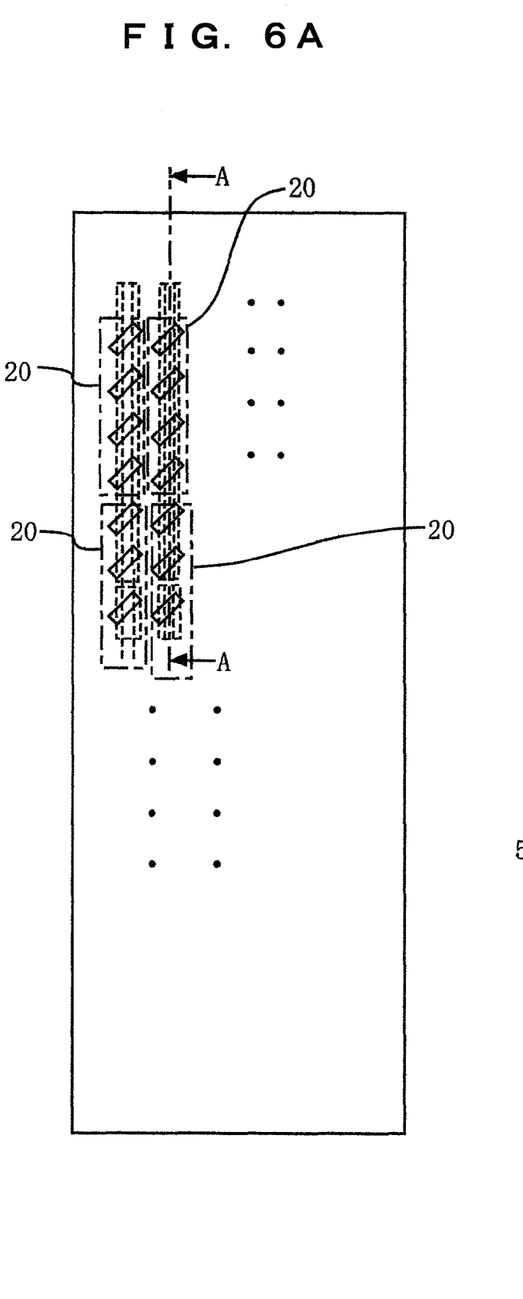
FIG. 6 is a set of views for explaining the configuration of a coaxially-fed slot array antenna according to Embodiment 4.
Figure 6B:
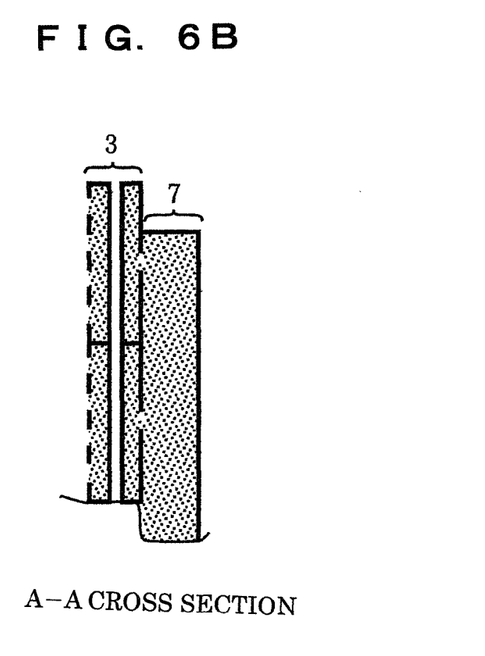
Figure 6C:
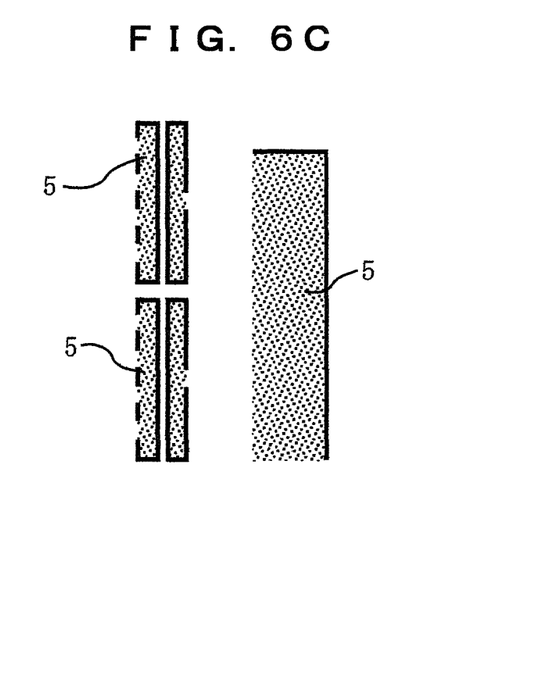

FIG. 6 is a set of views illustrating the configuration of a coaxially-fed slot array antenna according to Embodiment 4; FIG. 6A is a plan view; FIG. 6B is a cross-sectional view taken along the plane A-A; FIG. 6C is a view for explaining a production process.

In Embodiment 4, in the first place, the foamed dielectric 5 for forming the coaxial line unit 3 and the feeding waveguide 7 is preliminarily produced through extrusion molding or the like.

Then, by masking the molded component produced through the extrusion molding (i.e., the foamed dielectric a produced through the extrusion molding), plating (conductive plating) with a conductive metal such as Cu, Au, or Ni is applied to portions where the plating is required. The state described above is illustrated in FIG. 6C.

After that, as illustrated in FIG. 6B, the components to which the conductive plating has been applied are bonded with a conductive adhesive so as to be integrated.

In FIG. 6B or FIG. 6C, the portions to which the conductive plating is applied are illustrated with thick lines. The conductive plating is applied to the endfaces, of the foamed dielectric 5, perpendicular to the direction of the axis (i.e., the coaxial inner conductor 4 as the center axis of the coaxial line unit 3) and to the part of the inner and the outer circumference of the foamed dielectric 5; the foamed dielectric 5 functions as a reflection body that reflects an electromagnetic wave.

In addition, in place of conductive plating, conductive paint may be painted.

As described above, by applying conductive plating or conductive painting to the endfaces, of the foamed dielectric 5, perpendicular to the axis direction and to part of the inner and the outer circumference of the foamed dielectric 5, thereby making the foamed dielectric 5 reflect an electromagnetic wave, a partition (short-circuiting plate) can be provided every longitudinal length of the coaxial line unit, whereby no metal partition is required.

Moreover, by applying conductive plating or conductive painting to the foamed dielectric 5 so as to form the waveguide 7, the coaxial line unit 3 and the feeding waveguide 7 can be formed regardless of the inner conductor of the coaxial line unit 3 and the metal outer wall.

As explained above, in the coaxially-fed slot array antenna according to Embodiment 4, the coaxial inner conductor and the coaxial outer conductor 6, which configure the coaxial line unit 3, and the outer conductor of the feeding waveguide 7 are formed through conductive plating or conductive painting.

Accordingly, regardless of a metal partition, a partition (short-circuiting plate) can be provided every unit length of the coaxial line unit; therefore, the distance between the adjacent sub-arrays can be shortened, and it is not required to produce with metal the coaxial inner conductor and the coaxial outer conductor 6, which configure the coaxial line unit 3, and the outer conductor of the feeding waveguide 7, whereby the downsizing and the weight saving of the coaxial line unit and the feeding waveguide can be achieved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A coaxially-fed slot array antenna comprising:
a coaxial line unit configured with a coaxial inner conductor and a coaxial outer conductor that incorporates the coaxial inner conductor;
a feeding waveguide for feeding an electromagnetic wave to said coaxial line unit by way of a feeding slot; and
a sub-array configured, corresponding to said coaxial line unit, with a plurality of emission slots formed on the external wall surface of said coaxial outer conductor;
wherein a plurality of the sub-arrays are arranged in line along the axis direction of said coaxial line unit or in parallel along the axis direction of the coaxial line unit, wherein the space enclosed by said coaxial inner conductor and said coaxial outer conductor is filled with a first foamed dielectric having a predetermined foaming rate per individual sub-array, causing the feeding phase to be changed per individual sub-array,
wherein the coaxial line unit includes a plurality of portions that partition said coaxial inner conductor and said coaxial outer conductor in a direction perpendicular to the axis direction of the coaxial line unit, and
wherein the plurality of portions are filled with a second foamed dielectric having a foaming rate different from said predetermined foaming rate per individual sub-array.

2. The coaxially-fed slot array antenna according to claim 1, wherein the foaming rate of said first foamed dielectric is increased or decreased in some portion thereof, along the axis direction of said coaxial inner conductor, such that an increased or decreased porosity of said first foamed dielectric resulting from the increased or decreased foaming rate, respectively, causes a current to become maximal at antinodes of a standing wave that occurs in said coaxial inner conductor.

3. The coaxially-fed slot array antenna according to claim 1, wherein for each sub-array, the foaming rate of said first foamed dielectric with which the corresponding coaxial line unit is filled is increased or decreased with respect to the foaming rate of said first foamed dielectric with which a corresponding coaxial line unit of at least one other sub-array of said plurality of said sub-arrays is filled.

4. The coaxially-fed slot array antenna according to claim 1, wherein said coaxial inner conductor and said coaxial outer conductor, which configure said coaxial line unit, and an outer conductor of said feeding waveguide are formed through conductive plating or conductive painting.

5. A vehicle radar apparatus utilizing the coaxially-fed slot array antenna according to claim 1.

6. A vehicle radar apparatus utilizing the coaxially-fed slot array antenna according to claim 2.

7. A vehicle radar apparatus utilizing the coaxially-fed slot array antenna according to claim 3.

8. A vehicle radar apparatus utilizing the coaxially-fed slot array antenna according to claim 4.

9. The coaxially-fed slot array antenna according to claim 1, wherein the feeding waveguide is disposed underneath the plurality of sub-arrays in the direction perpendicular to the axis direction of the coaxial line unit and is filled with a third foamed dielectric.

10. The coaxially-fed slot array antenna according to claim 9, further comprising a feeding slot that is disposed between the plurality of sub-arrays and the feeding waveguide and is filled with a fourth foamed dielectric.

\* \* \* \* \*